Sept. 9, 1969 H. HEITMANN 3,466,607

CONTROL CIRCUIT FOR GLASS REED MATRIX

Filed July 6, 1966 2 Sheets-Sheet 1

United States Patent Office 3,466,607
Patented Sept. 9, 1969

3,466,607

CONTROL CIRCUIT FOR GLASS REED MATRIX

Herbert Heitmann, Ludwigsburg-Eglosheim, Germany, assignor to International Standard Electric Corporation, New York, N.Y., a corporation of Delaware Filed July 6, 1966, Ser. No. 563,178
Claims priority, application Germany, July 15, 1965, St 24,139
Int. Cl. H04q *1/18*
U.S. Cl. 340—166 6 Claims

ABSTRACT OF THE DISCLOSURE

A telephone system switching multiple operating on a guide wire principle and using adhesive relay crosspoints. Two separate leads are used per guide wire, one lead for the offering signal and one lead for the access signals. The access signals are used for setting, releasing the switching relays, and supervising the setting and releasing process. The supervision is carried on over a circuit that includes series of connected break contacts of the switching relays, coupled to the access lead.

The invention relates to a circuit arrangement for controlling and supervising switching multiples and more particularly to controls for glass reed matrices used in telephone exchange systems operating on the guide-wire principle.

One form of telephone exchange systems operates on the guide-wire principle. According to this principle, the selection of a connection, determination and through-connecting of a path within a switching network, is performed in two steps. After a called number has been dialed, an offering signal is given through the marking network, as a first step. In most cases, the offering signal is sent from the destination of a desired switch path, back through the matrix to the path to the origin. The offering signal is extended from switching stage to switching stage via all connecting path portions which are idle and available at that time and which are suitable for establishing a connection to the wanted subscriber. The second step comprises an access process during which an access signal is sent in the opposite direction to select a distinctly defined path from among the paths marked by the offering signal. In each switching stage, the access signal causes the connection of a marker which selects the first line reached with the aid of a selecting chain. This, in turn, provides an offering signal, to which the access signal is applied again.

This two step process occurs successively in each switching stage until a definite switch path is established through the entire switching network. The crosspoint elements can be actuated either immediately for each stage, or after the entire connecting path has been established. For the entire connection, all crosspoints operate in all stages in common responsive to a through-connecting order. Conventionally, they are held by means of circuits passing over the sleeve or *c*-wires. Thus, unlike the step-by-step selectors, a holding current is required for holding the crosspoint elements in an operated condition after the connection has been established This current consumption during a call can be avoided, if adhesive relays are used as crosspoint elements. For either setting or releasing, those relays require only a current surge of a definite minimum magnitude. However, a failure of either the adhesive type relay or its control facilities cannot be detected at once, and a failure neither releases nor operates the adhesive relay. It is therefore necessary to supervise the setting and release of an adhesive relay.

Therefore, an object of the invention is to provide a circuit arrangement to control and supervise switching multiples constructed of adhesive relays and used in a telephone exchange system operating on the guide-wire principle. This control and supervision is provided by means of two different signal wires (offering wire and access wire) used for offering and access, respectively. The access wire serves to set and release the switching relays. The setting and release is supervised over this wire and break-contact on the switching relays which belong to an output of a switching multiple.

According to a further embodiment of the invention, each terminating offering wire in each switching multiple is connected with a common point. That point is also connected with the outgoing offering wires through series-connected further break-contacts of the switching relays belonging to an output of the switching multiple.

For such a circuit arrangement, the use of adhesive relays with ball-type armature contacts, is particularly suitable. These relays have a break-contact and a make-contact in a sealed-tube.

The above mentioned and other features and objects of this invention and the manner of obtaining them will become more apparent, and the invention itself will be best understood by reference to the following description of an embodiment of the invention taken in conjunction with the accompanying drawings, in which.

Figure 1:
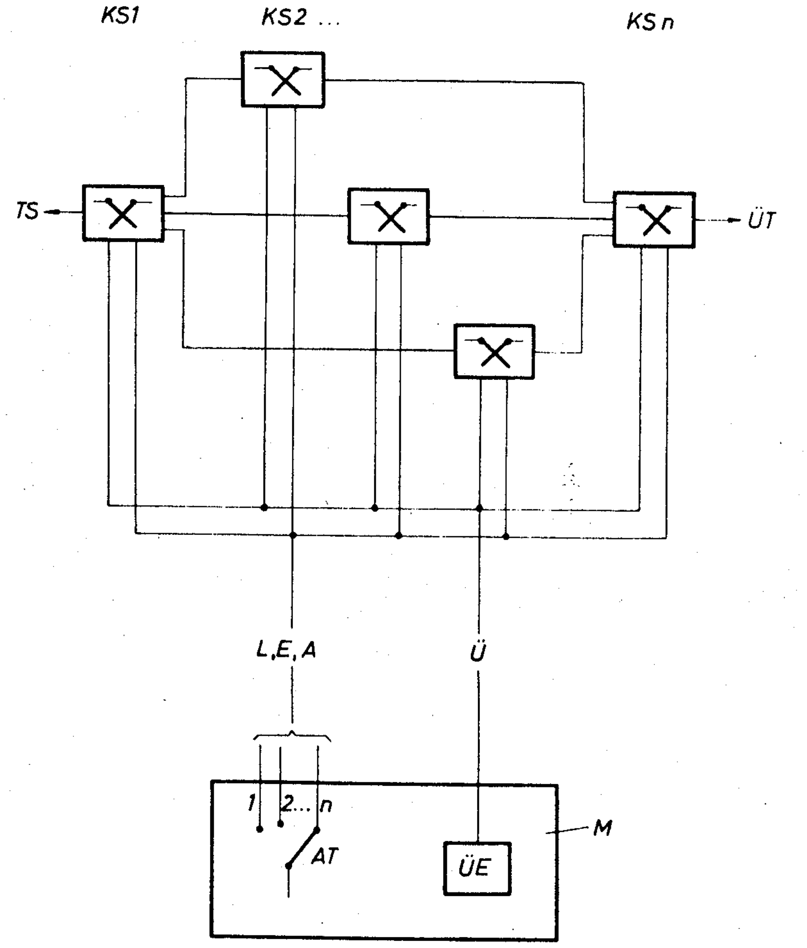
FIG. 1 shows a schematic representation of a multistage crosspoint arrangement and a marker for controlling and supervising the arrangement.

The crosspoint arrangement, shown in FIG. 1 has the switching stages KS1, KS2 . . . KS*n*. Only one switching multiple is shown in each stage; however, it should be understood that any number may be provided. The input of the crosspoint arrangement is connected with a subscriber loop TS through which the offering potential is applied to the switching multiple KS1. This offering potential passes through all switching stages and appears at the output of the crosspoint arrangement in stage KS*n*.

A control link UT is connected to the output of stage KS*n*. After having selected an output line, the link UT applies the access signal to the switching multiple KS*n*. An (electronic) stepping or sequence switch AT in the marker M normally rests on the step *n*. During the marking process, this switch steps successively up to step 1 and applies signals through the lines L, E to all switching stages KS*n* to KS1. This switch selects one of the idle parital connecting leads within a switching multiple.

Proper setting of the respective crosspoint elements is supervised by means of a supervising device UE which is connected to all switching multiples of the crosspoint arrangement via a line U. As an alternative to this arrangement, the supervising device UE can also be successively connected to the individual switching stages through a separated step-by-step wiper arm.

To release an existing connection, the access potential is again applied from the link end to the corresponding output of the crosspoint arrangement. In this case, the stepping switch AT allocates all switching stages, via the leads A, starting from step 1. During this releasing process, the partial connecting leads of the connection to be released are successively released within all switching stages. The correct release is again supervised by the supervising device UE.

Figure 2:
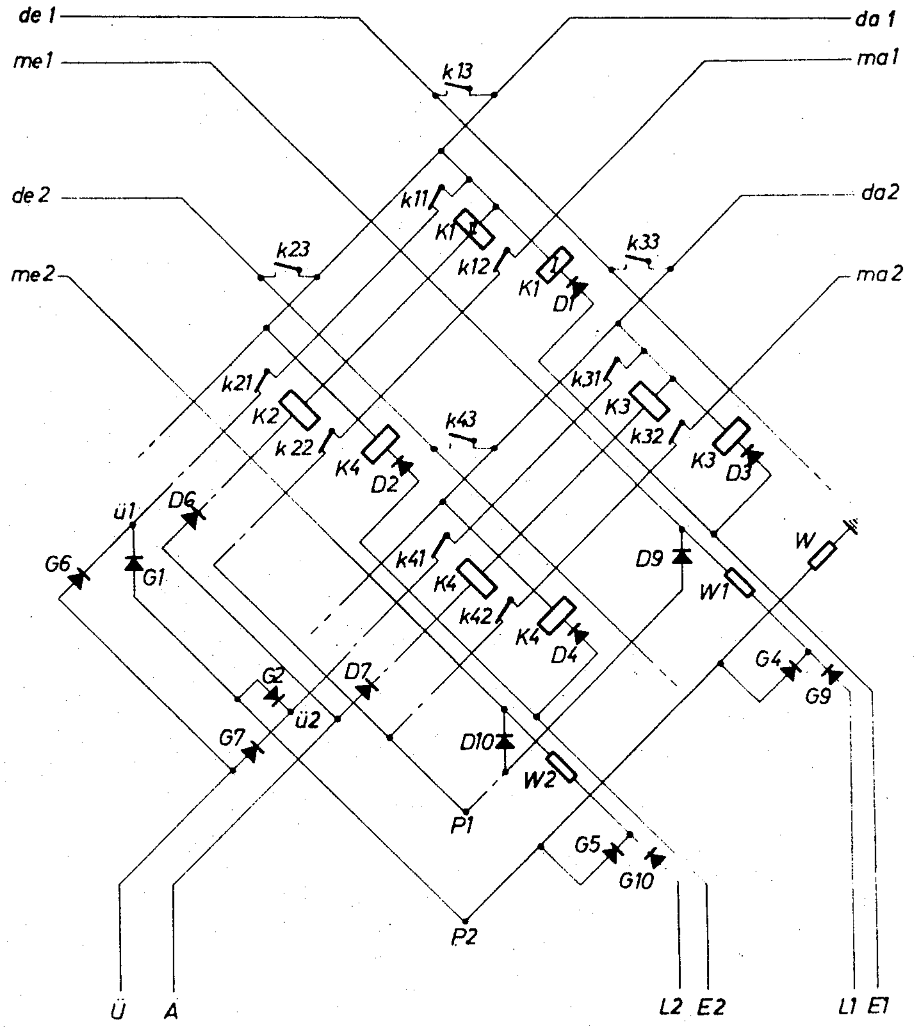
FIG. 2 shows a circuit arrangement of a switching multiple of the crosspoint arrangement, shown in FIG. 1.

The construction of a switching multiple, shown in FIG. 1, is represented in FIG. 2. This figure shows an exemplary two inputs (*de*1, *me*1 and *de*2, *me*2) and two outputs, as well as four crosspoints (*k*13, *k*23, *k*33 and *k*43). The figure shows a guide wire lead *m*, which is called an offering wire in the following specification. Another wire guide lead *d* is called an access wire in the following specification. These wires are extended from each input or output, respectively and compare the guide wires of the guide wire network. The switching network for the wires *a*, *b*, *c*, has not been shown.

Adhesive relays K1 to K4, each with two windings I, II, are used as switching relays. The winding I is called a setting winding, and the winding II is called a release winding. In the contact reference numerals, the letter and the first digit refers to the pertinent relay, while the second digit indicates a particular contact on the relay. Furthermore, the figure shows a supervising wire U, a release wire A, reading wires L1, L2, and setting wires E1, E2,, all these wires being connected with a marker, as indicated in FIG. 1.

A negative offering potential (e.g. —48 v.) is applied to the terminating offering wires *me*1, *me*2, from the subscriber's end of the network, if the pertinent outputs of the preceding switching stages are idle. This offering potential is sent, via the diodes D9, D10, to a common point P1. The outgoing offering potential is thus applied to the wire *ma*2 from point P1 over the series-connected break-contacts *k*42, *k*32 of the relays K4, K3, and to the outgoing offering wire *ma*1 over the series-connected break-contacts *k*22, *k*12 of the relays K2, K1. These wires further transfer the offering potential to the next following switching stage. The offering potential passes through all switching stages in the same way. Finally, the offering potential is received and evaluated in a central device.

The offering potential sent over the offering wires *me*1, *me*2, is also fed into voltage dividers associated with the offering wires. These voltage dividers consist of a resistor W1 or W2 and a diode G4 or G5 respectively, and a common resistor W. At the connecting point between the resistor W1 and the diode G4, the reading wire L1 is connected via a diode G9. To this connecting point, a potential is applied which is (substantially) more positive than the offering potential of —48 v. An equal potential is also applied to the connecting point between the resistor W2 and the diode G5, to which point the reading wire L2 is connected via a diode G10. The common connecting point of the diodes G4, G5, with the resistor W, is the second common point P2.

After selecting an output, e.g. the first output of the switching multiple, negative access potential (for example again —48 v.) is applied to the outgoing access wire *da*1. This access potential reaches point P2 through series-connected break-contacts *k*11, *k*21 of the relays K1, K2 to back bias the diodes G4, G5 so that the offering potential is sent to the marker over the reading wires L1, L2. Thus, the reading wires bearing the offering potential are idle. Now the idle paths are determined. The marker selects which of the idle paths will be used. This may be done chronologically or on any well known priority system. One of the marked wires is selected in the marker, e.g. the reading wire L1. Then a ground potential is applied to the pertinent setting wire E1 for a short time. Responsive to this ground potential, the adhesive relay K1 operates and locks. The operate circuit may be traced from wire E1 through setting winding I of relay K1 to the access wire *da*1.

With its contct *k*11, relay K1 removes the access potential from point P2 and from the supervising wire U, connected to the supervising outputs *u*1, *u*2 via the diodes G6, G7. This potential change on the supervising wire U is received and evaluated by the marker as an acknowledging signal for the through-connection. The opening of contact *k*12 prevents the offering potential from reaching the succeeding switching multiple via the outgoing offering wire *ma*1. The access wires *da*1, *de*1 are connected through contact *k*13, thus defining and selecting an output of the preceding switching stage. Corresponding processes occur in the preceding switching stage as soon as the stepping switch AT has reached the preceding step.

To release a connection, an access potential is applied from the link end to the access wire *d* of the connection to be released. This potential is applied over the through-connected access wire *d* to the first switching stage wherein the release commences. The stepping switch AT makes contact with the release wire A of the switching network KS1 and applies a ground potential to this release wire for a short time. The release potential reaches, through decoupling diodes D6, D7, the series-connections of release windings II of the relays K1, K2 and K3, K4, respectively, which belong to an output of the releasing path. These series-connections are connected to the pertinent outgoing access wires *da*1, *da*2, but because access potential is applied only to the access wire *da*1, a release current flows only through the release windings II of the relays K1, K2. Relay K1 is therefore restored to normal, while the already restored relay K2 is not influenced. The release of relay K1 is supervised in that the access potential is again transferred to the supervising wire U through the contacts *k*11, *k*21 and through the diode G6. This potential change is received and evaluated in the marker as an acknowledging signal for the release. All successive switching multiples are actuated in sequence and the switching relays, belonging to the connection to be released, are released in an analogous manner. Malfunctions can be registered and signalized at the central unit.

Since the offering potential passes across the break-contacts of the switching relays, a not released column (K1, K2) in the switching multiple cannot be seized again. Consequently, no erroneous double seizing can occur. The corresponding line (*da*1, *ma*1), is only withdrawn from the switching traffic. Through registering at the central unit it is secured that this line can be determined again.

The releasing method described offers the possibility of partially releasing a connection only if so required. Such a case occurs, for example, when a connection is rerouted in another direction. According to a program set in the marker, only those of the switching relays of those switching stages are released which do no more than participate in establishing the rerouted connection.

In the described arrangement, the access wire *d* can be used to transmit a special class of service signal, used, for example, to check the right-of-way of a subscriber at a subscriber identification, or for routine checkings.

Figure 3:
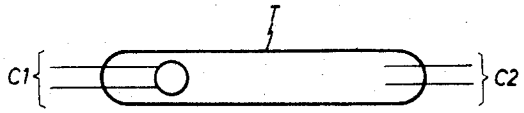
FIG. 3 shows a ball armature glass reed relay contact.

The arrangement is of particular advantage when adhesive relays with ball-type armature contacts (FIG. 3) are used as switching relays. They have a sealed glass tube T, at both ends of which two contact springs C1, C2 are inserted, respectively. When the relay is released a ball connects the contact springs provided at one end of the tube, thus forming a break-contact while, when the relay is energized, the ball is moved to the other end of the tube for bridging the other two contact springs, thus forming a make-contact.

I claim:

1. A control and supervision arrangement for a network of adhesive glass reed crosspoints comprising a plurality of guide wires, each guide wire comprising an offering lead and an access lead, means for sending offering signals over said offering lead, and access signals over said access lead, means responsive to an access signal sent over the access lead for selectively operating said glass reed crosspoint associated with the lead when said glass reed crosspoint is in a released condition, and for selectively releasing said associated glass reed crosspoint when said associated glass reed crosspoint is in an operated condition, and supervisory wire means coupled to said access wire through a series of contacts on the crosspoints for carrying the access signal to supervise said operation and release of said crosspoints.

2. The arrangement of claim 1 incuding isolating means associated with each terminating end of an offering lead for connecting said offering lead with a common point, and means for connecting said common point with an outgoing offering lead via said series of contacts on said crosspoints, and wherein said series of contacts are break contacts.

3. The arrangement of claim 1 and wherein said adhesive crosspoints have ball-type armature contacts.

4. The arrangement of claim 1 wherein each of said crosspoints comprise a two winding relay, one of said windings being a setting winding and the other of said windings being a release winding, and means for series connecting the release windings of the crosspoints in an established path, said series connections including a diode between each relay.

5. The arrangement of claim 4 and means whereby the setting windings of said crosspoint relays are connected between an outgoing access wire and a setting wire, a diode being interposed between said setting wire and said winding, and means comprising contacts on said relays for interconnecting incoming and outgoing access wires.

6. The arrangement of claim 5 and means for partially releasing an established path during rerouting.

References Cited

UNITED STATES PATENTS 3,324,249 6/1967 Cotroneo et al.

DONALD J. YUSKO, Primary Examiner

U.S. Cl. X.R.

179—18